US012011696B1

(12) United States Patent
Echenagucia Cioppa

(10) Patent No.: US 12,011,696 B1
(45) Date of Patent: Jun. 18, 2024

(54) HOT CRUDE GRAVITY DRAINAGE (HCGD) FOR HEAVY AND EXTRA-HEAVY ENHANCED OIL RECOVERY (EOR)

(71) Applicant: DELFOS CAPITAL LLC, Lewes, DE (US)

(72) Inventor: Jorge Enrique Echenagucia Cioppa, Caracas (VE)

(73) Assignee: DELFOS CAPITAL LLC, Lewes, DE (US)

( * ) Notice: Subject to any disclaimer, the term of this patent is extended or adjusted under 35 U.S.C. 154(b) by 0 days.

(21) Appl. No.: 18/362,126

(22) Filed: Jul. 31, 2023

(51) Int. Cl.
- C09K 8/592 (2006.01)
- B01F 23/47 (2022.01)
- E21B 43/12 (2006.01)
- E21B 43/38 (2006.01)
- B01F 101/49 (2022.01)

(52) U.S. Cl.
CPC ............ *B01F 23/471* (2022.01); *C09K 8/592* (2013.01); *E21B 43/121* (2013.01); *E21B 43/38* (2013.01); *B01F 2101/49* (2022.01)

(58) Field of Classification Search
CPC ..................................................... E21B 43/24
See application file for complete search history.

(56) References Cited

U.S. PATENT DOCUMENTS

| | | | | |
|---|---|---|---|---|
| 4,407,367 A | * | 10/1983 | Kydd | E21B 36/006 166/267 |
| 2010/0276140 A1 | * | 11/2010 | Edmunds | E21B 43/2408 166/272.3 |
| 2017/0051214 A1 | * | 2/2017 | Randhava | C01B 3/48 |

* cited by examiner

Primary Examiner — William D Hutton, Jr.
Assistant Examiner — Avi T Skaist
(74) Attorney, Agent, or Firm — Rothwell, Figg, Ernst & Manbeck, P.C.

(57) ABSTRACT

A continuous process for enhanced oil recovery (EOR) to be used in heavy and extra heavy oil wells, where low and/or non-profitable production rates occur is presented. The process is named Hot Crude Gravity Drainage (HCGD), and HCGD may include different components to support the heating of crude produced in the oil well that is later going to be injected at the same volumes as heated crude. The crude may be injected in the sand from which it was produced, in order to continuously supply the required energy to significantly lower the viscosity, which in turn increases mobility in the pores of the producing sand and allows for an increment (e.g., of more than 100%) in production as regards the base or initial production of the oil well, in a 45 consecutive day period. The process unit may be simple, compact, modular and skid mounted.

4 Claims, 2 Drawing Sheets

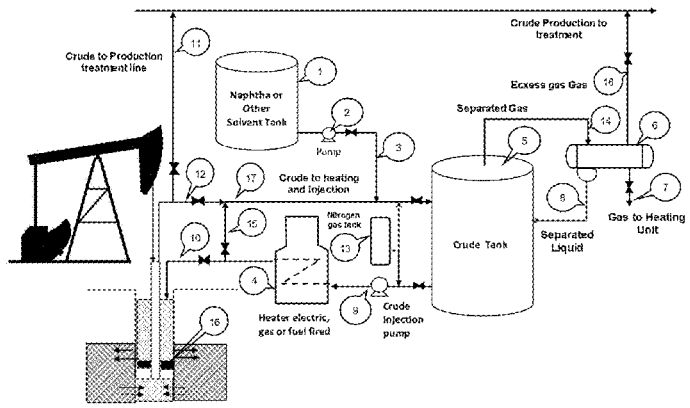

FIG: 1

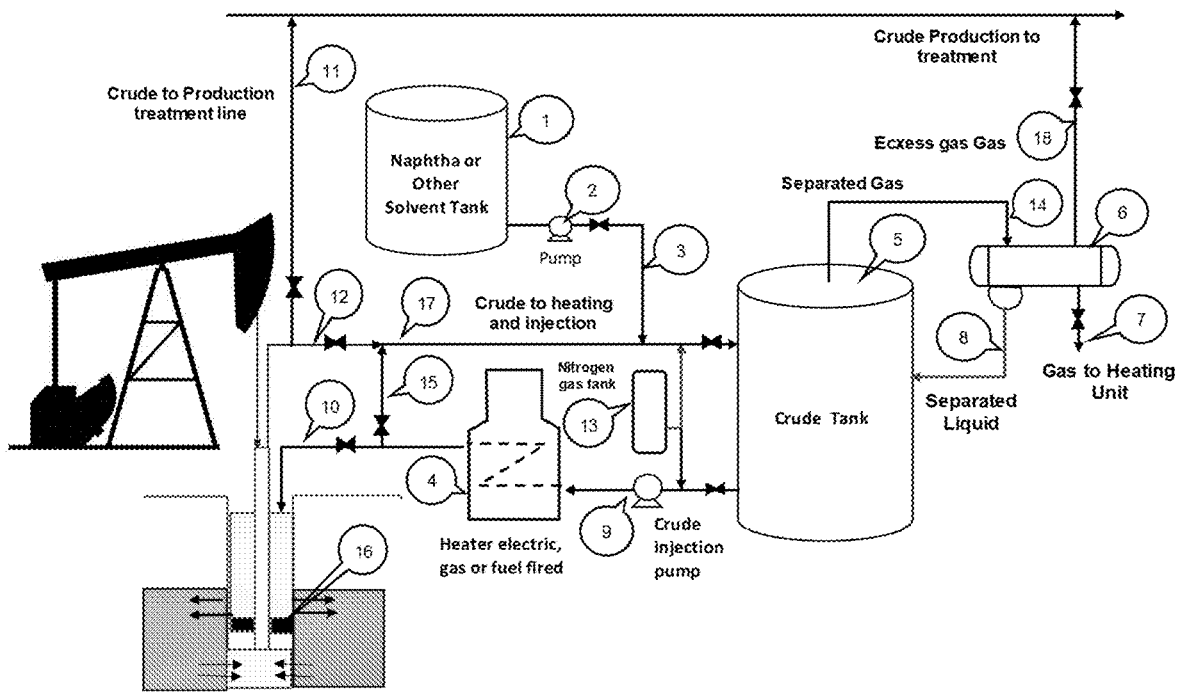

| | | | |
|---|---|---|---|
| 1 | Naphtha or other solvent tank | 11 | Excess crude to production line |
| 2 | Solvent Pump | 12 | Crude fraction to heating |
| 3 | Solvent injection line | 13 | Nitrogen cooling and displacement system |
| 4 | Heating unit gas or electric | 14 | Separated gas to Stabilization Tank |
| 5 | Crude tank | 15 | Hot crude fraction to heat cold crude |
| 6 | Gas stabilization Tank | 16 | High temperature Gasket |
| 7 | Gas to heating unit | 17 | Heated crude mix |
| 8 | Gas Liquids | 18 | Excess Gas to production Line |
| 9 | Crude Injection Pump | | |
| 10 | Hot crude to production sand | | |

FIG. 2

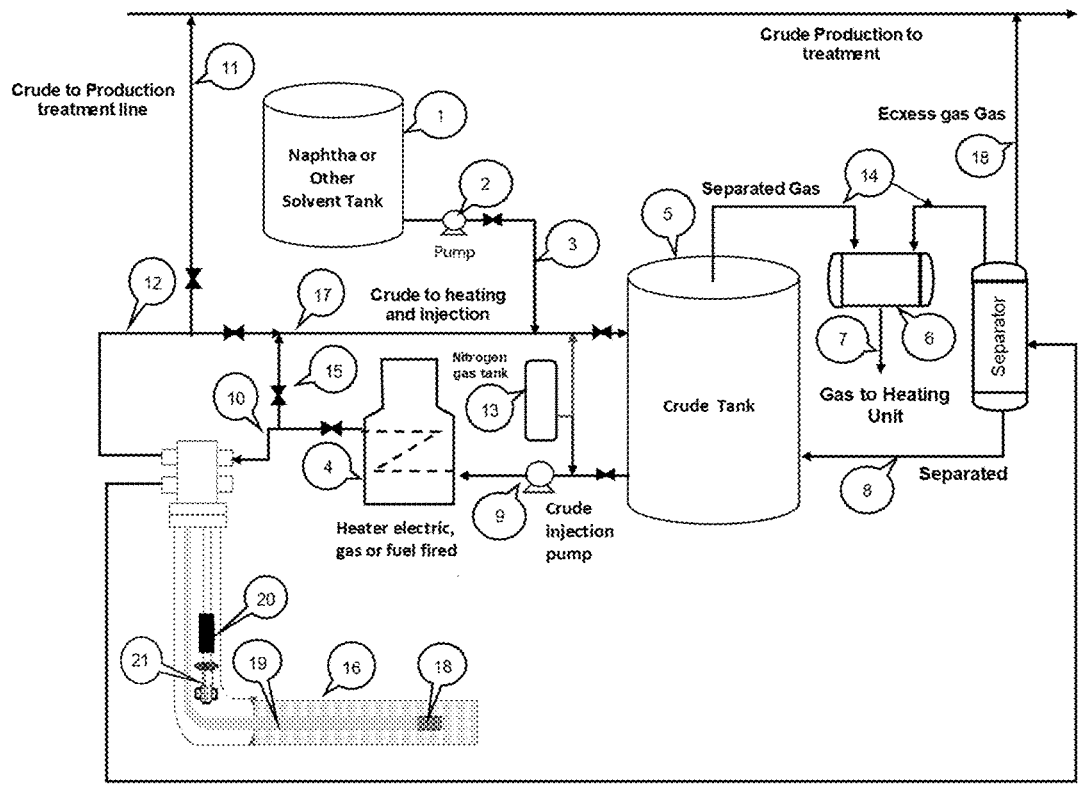

1. Naphtha or other solvent tank
2. Solvent Pump
3. Solvent injection line
4. Heating unit gas or electric
5. Crude tank
6. Gas stabilization Tank
7. Gas to heating unit
8. Gas Liquids
9. Crude injection Pump
10. Hot crude to production sand
11. Excess crude to production line
12. Crude Production
13. Nitrogen cooling and displacement system
14. Separated gas to Stabilization Tank
15. Hot crude fraction to heat cold crude
16. Horizontal well ranurated liner
17. Heated crude mix to crude tank
18. Excess Gas to production Line
18. Injection Nozzle
19. Hot crude inkection line
20. Progressive Cavity Pump
21. Gas Separator

HOT CRUDE GRAVITY DRAINAGE (HCGD) FOR HEAVY AND EXTRA-HEAVY ENHANCED OIL RECOVERY (EOR)

TECHNICAL FIELD

The technical field relates generally to production of heavy and extra-heavy crude oil and, more specifically, to a process to improve the production rate of heavy and extra-heavy crude oils in vertical, horizontal, sidetrack, multilateral and designer oil wells.

Definitions

For the purposes of the process described in this document, the following definitions apply to characterize the crude oil subject to this invention:

| Crude Type | API Gravity | Specific gravity |
|---|---|---|
| Light Crude | >31.1 | <0.87 |
| Medium Crude | 22.3-31.1 | 0.92-0.87 |
| Heavy Crude | 10-22.3 | 1.0-0.92 |
| Extra-Heavy Crude | <10 | >1.0 |

BACKGROUND OF THE INVENTION

The production of heavy and extra-heavy crude oils encounters decreasing production rates when the associated gas in the reservoir is sent with the crude to the surface and/or as the reservoir temperature decreases in time. Due to high viscosities, these crudes need energy to be transported from the reservoir to the surface. Initially, the production could be energized with associated gas or high reservoir temperature that induces the natural flow of oil, but soon an oil pump must be installed to increase and maintain production. Finally, as the well continues to produce crude and gas, the required energy supplied by dissolved gas and the high bottom hole temperature decrease and affect the performance of the oil pump. The production rate falls below profitability limits and additional energy must be supplied to the production sand to decrease crude viscosity and boost its transport to the surface.

Enhanced Recovery Methods (EOR) for heavy and extra heavy crude oil are employed to raise the extraction of oil from reservoirs that have already undergone primary recovery techniques. These methods aim to improve sweep efficiency, increase reservoir pressure, and reduce oil viscosity, allowing for greater oil recovery. Here are some conventional methods of secondary recovery for heavy and extra heavy crude oil:

1. Waterflooding: Waterflooding is a widely used secondary recovery method. It involves injecting water into the reservoir to displace the oil and drive it towards production wells. The injected water helps maintain reservoir pressure and reduces oil viscosity, facilitating its flow.
2. Cyclic Steam Injection: CSI is an effective method for heavy and extra heavy crude oil recovery. 5,000 to 10,000 tons of steam are injected into the reservoir in a period of 25 days, through the production tube to heat the oil, reduce its viscosity and improve its mobility and after a 5 to 7 days soaking period, the heated oil is then produced
3. Polymer Flooding: Polymer flooding involves injecting polymer solutions into the reservoir. The polymers increase the viscosity of the injected water, which helps to improve sweep efficiency by reducing the fingering effect and improving the mobility ratio between the displacing fluid and the oil.
4. Surfactant Flooding: Surfactant flooding utilizes the injection of surfactant solutions to reduce interfacial tension between oil and water. This method improves the displacement of oil by water, leading to increased recovery. Surfactant flooding is often combined with polymer flooding for better performance.
5. $CO_2$ Injection: Carbon dioxide ($CO_2$) injection involves injecting $CO_2$ into the reservoir. $CO_2$ can dissolve in oil, reducing its viscosity and improving its flow properties. Additionally, $CO_2$ acts as a displacing agent, pushing oil towards production wells.
6. In-situ Combustion: In-situ combustion, also known as fire flooding, involves igniting a portion of the oil in the reservoir to generate high-temperature combustion gases. The hot gases heat the surrounding oil, reducing its viscosity and improving its mobility.
7. Solvent Extraction: Solvent extraction methods involve injecting solvents such as propane, butane, or solvent-diluted hydrocarbon gases into the reservoir. These solvents mix with the heavy oil, reducing its viscosity and facilitating its recovery.
8. Steam assisted gravity drainage (SAGD): it is a method of continuous steam injection but it requires to have two horizontal oil wells, an injector and a producer, or several vertical producing wells with an injector well equidistant.

SUMMARY OF THE INVENTION

Work has been done to develop a process, using a fraction of the heavy or extra-heavy crude oil produced in the oil well, heating it to a suitable temperature, and injecting the hot crude into the production sand continuously to provide the required energy to significantly increment the production rate of the well, at a lower investment and operating cost when compared to other secondary recovery processes.

The main advantage of HCGD is that it does not require the use of either water, solvents, polymer or chemical additives that could cause damage to the reservoir and, in addition, cause a significant increase on investment and production costs. Therefore, a need exists for improvement over the previous described processes and more particularly for processes and systems to increase production rates, without causing damage to the producing oil sand and maintaining oil production for as long as there are enough crude oil reserves in the well producing zone (low production decline).

The aforementioned conventional processes do not report the continuous injection of hot heavy or extra heavy crude, using crude produced by the same recipient oil well, for enhanced recovery, as previously described.

Aspects of the present invention relate to a method of enhanced oil recovery (EOR) for vertical oil wells producing heavy and extra-heavy crude (reference numerals refer to FIG. 1). The method may include starting the heating process. All the base production of cold heavy and/or extra heavy crude oil coming from the oil well may be mixed with an appropriate volume of solvent (1, 2, 3 and 17) to lower its viscosity and ease its transportation to the crude tank (5). The injection line to the wellhead may be shut off (10) until the crude tank level reaches, for example and without limitation, 70%. After about 20% of the crude tank volume is reached, the heating unit (4) may be started, and diluted crude from the crude tank may be pumped to the heating unit.

The method may include heating the crude oil to the required injection temperature. The heating unit can use fuel gas produced by the oil well or electricity to power electric heaters. The associated gas (14) blended with the crude oil may be separated at the crude tank (5) and sent to a separator (6) to remove its liquid content (8), and the resulting gas (7, 18) could be used as fuel gas or is sent to the crude production line. The diluted crude from the crude tank (5) may be heated, while new incoming crude (12) is mixed with heated crude (15), and the mix (17) may be sent to the crude tank (5). The incoming crude may be heated until, for example and without limitation, 70% of the volume of the tank (5) is reached. The crude tank suitable storage temperature may be adjusted by recycling a fraction of the hot crude (15) from the exit of the heating unit (4), into the crude tank (5).

The method may include injecting a suitable volume of the hot crude into the production sand at an appropriate pressure. The required volumetric rate of hot crude may be sent from the heating unit to the wellhead connecting (10) with the casing or annular space of the well. In the case of vertical oil wells, the hot crude may be pressurized in the casing against the high temperature gasket (16) and may be forced into the selected zone of the production sand. The hot crude flow and pressure may be adjusted at the hot crude pump in the surface heating unit (9). The magnitude of the injecting pressure will depend on the reservoir pressure and the characteristics of the producing sand (pore size, sand channels, permeability, etc.). Injected crude rate, crude production rate and injection temperature and pressure may be measured and recorded automatically at the surface heating unit.

Table N°1 shows the 30 days effect of injecting heated crude according to a non-limiting example in a vertical well producing 11° API crude, with an initial production of 20 BPD, after 5 cycles of steam injection. Table N°1 shows that the production of the well increased from 20 BPD to 217 BPD with a net crude production differential of 197 BPD.

TABLE N°1

Crude Injection Vs. Volumetric Production

| Days | Injected Crude BPD | Crude Production BPD | Effective Production BPD | Acumulated Production |
|---|---|---|---|---|
| 1 | 0 | 23 | 0 | 0 |
| 2 | 0 | 27 | 0 | 0 |
| 3 | 0 | 31 | 0 | 0 |
| 4 | 0 | 35 | 0 | 0 |
| 5 | 0 | 41 | 0 | 0 |
| 6 | 0 | 47 | 0 | 0 |
| 7 | 0 | 54 | 0 | 0 |
| 8 | 0 | 62 | 0 | 0 |
| 9 | 0 | 71 | 0 | 0 |
| 10 | 62 | 81 | 61 | 81 |
| 11 | 62 | 90 | 70 | 151 |
| 12 | 62 | 100 | 80 | 231 |
| 13 | 62 | 109 | 89 | 320 |
| 14 | 62 | 118 | 98 | 418 |
| 15 | 62 | 128 | 108 | 526 |
| 16 | 62 | 137 | 117 | 644 |
| 17 | 62 | 147 | 127 | 770 |
| 18 | 62 | 156 | 136 | 906 |
| 19 | 62 | 166 | 146 | 1.052 |
| 20 | 62 | 175 | 155 | 1.207 |
| 21 | 62 | 184 | 164 | 1.371 |
| 22 | 62 | 194 | 174 | 1.545 |
| 23 | 62 | 203 | 183 | 1.728 |
| 24 | 62 | 213 | 193 | 1.921 |
| 25 | 62 | 222 | 202 | 2.123 |
| 26 | 62 | 231 | 211 | 2.335 |
| 27 | 62 | 241 | 221 | 2.556 |
| 28 | 62 | 250 | 230 | 2.786 |
| 29 | 62 | 260 | 240 | 3.026 |
| 30 | 62 | 269 | 249 | 3.275 |

The surface heating unit may be 7×13 feet, and it may be skid mounted and designed to become a part of the fixed equipment of the oil well. Even though the preliminary design has been made for a single oil well, the process is scalable and could be designed and constructed to render service to more than one oil well at the same time, depending on the geographical distance of the wells.

Some aspects of the present invention relate to a method of enhanced oil recovery (EOR) for horizontal oil wells producing heavy and extra-heavy crude (reference numerals refer to FIG. 2). The method may include starting the heating process. Initially, all the cold heavy and/or extra heavy crude oil volume (12) coming from the oil well may be mixed with an appropriate volume of solvent to lower its viscosity and ease its transportation to the crude tank (5). After a volume threshold (e.g., about 20% of the crude tank volume) is reached, the heating unit (4) may be started and diluted crude from the crude tank may be pumped to the heating unit.

The method may include heating the crude oil to the required injection temperature. The heating unit (4) can use fuel gas produced by the oil well or electricity to power electric heaters. The associated gas (14) blended with the crude oil may be separated at the crude tank (5) and sent to a separator (6) to remove its liquid content (8), and the resulting gas (7, 18) could be used as fuel gas or is sent to the crude production line. The diluted crude from the crude tank (5) may be sent by a crude injection pump (9) to the heating unit (4) and heated, while new incoming crude (12) may be mixed with heated crude (15), and the mix (17) may be sent to the crude tank (5). The incoming crude may be heated until, for example and without limitation, 70% of the volume of the tank (5) is reached. Crude tank suitable storage temperature may be adjusted by recycling a fraction of the hot crude from the exit of the heating unit (4), into the crude tank (5).

The method may include injecting a suitable volume of the hot crude (10) into the production sand at an appropriate pressure. The required volumetric rate of hot crude may be sent to the oil wellhead connecting with the hot crude injection line (19) as shown in FIG. 2. The hot crude may be sent to a selected site, through a pipeline and injection nozzle (18), near the end of the liner (16). The hot crude may be pressurized against the end of the liner and injected there into the oil producing sand, at a pressure above reservoir pressure. The magnitude of the injecting pressure will depend on the reservoir pressure and the characteristics of the producing sand (pore size, sand channels, permeability, etc.). Injected crude rate, crude production rate and injection temperature and pressure may be measured and recorded automatically at the surface heating unit. The heating unit may be 7 feet wide by 13 feet long, and it may be skid mounted and designed to become a part of the fixed equipment of the oil well.

Even though the preliminary design has been made for a single oil well, the process is scalable and could be designed and constructed to render service to more than one oil well at the same time, depending on the geographical distance from one well to others.

Aspects of the invention may be used for the purpose of recovering the abundant heavy and extra heavy crude oil trapped in the oil reservoir (oil sands), after natural flow and the primary crude production stages reach non profitable crude oil production levels due to the impossibility of the trapped crude to flow to the surface. The high viscosity of the heavy crude in the oil containing sands requires energy to flow. The primary energy in a virgin reservoir is the pressure of the crude associated gas, combined with the temperature of the reservoir. After the natural flow and primary production stage, both the associated gas volume and the temperature decrease to levels where the oil flow is too low to justify the profitability of the oil well operation. It is when aspects of the invention come into play to increment the temperature of the reservoir, increase the bottom hole pressure and decrease the viscosity of the crude oil, thus recovering and increasing the production rate to profitable levels once again. The technology may use oil produced in the oil well, heat it and reinject it into the oil sand continuously, thus increasing the temperature of the oil sand and exponentially decreasing the viscosity of the heavy and/or extra-heavy crude oil.

The new process may include two components: 1) the surface heating and injecting equipment and, 2) the specially designed injecting pipeline, installed through the oil well annular space, running from the surface to the selected injecting location at the horizontal or branched oil well. For vertical wells, the hot crude may be injected directly through the annular space.

The surface crude heating unit may be low cost, compact and/or skid mounted, and may be designed to be installed at the oil well, as an integral part of the production equipment of the well. It may be designed to heat and inject the hot crude continuously, 24 hour per day, to maintain production at a profitable level for a period ending when the existing oil in place reserves in the sand surrounding the oil well are recovered, at an oil recovery factor higher than the one registered in the primary recovery phase.

Aspects of the invention may include one or more of the following advantages over other existing enhanced oil recovery processes. Aspects of the invention may provide long term production levels with minimal oil production decline, when compared to other Enhanced Oil Recovery technology (EOR). Aspects of the invention may involve lower investment costs per produced BPD, when compared to other EOR processes. Aspects of the invention may involve lower operating costs per produced BPD when compared to other EOR. In some aspects, the process does not increment the water cut of the oil produced and/or in the producing oil sand. In some aspects, the process does not cause reservoir damage by scale deposition or reservoir permeability reduction because the process may use the same crude of the reservoir instead of water, foreign solvents or chemical substances that could cause incompatibility with the producing oil sands. In some aspects, the process may use environmentally friendly technology that does not emit liquid or solid pollutants. In some aspects, only treated fuel gas combustion emissions rendering about 5.100 Pounds per day of $CO_2$ are discharged. In some aspects, simple, compact, modular and/or skid mounted surface crude heating equipment, that is, for example and without limitation, 7 feet wide by 13 feet long and designed to be installed at the oil well, as fixed equipment.

BRIEF DESCRIPTION OF THE DRAWINGS

The accompanying drawings, which are incorporated herein and constitute a part of this disclosure, illustrate various non-limiting example representations of the present invention.

FIG. 1 is an example system in which the techniques described are applied to Heavy and Extra-Heavy crude in vertical oil wells, with any oil pumping to the surface method. A Pump Jack is shown as an example.

FIG. 2 is an example system in which the techniques described are applied to Heavy and Extra-Heavy crude in horizontal oil wells, with any oil pumping to the surface method. A Progressive cavity Pump (PCP) is shown as an example.

DETAILED DESCRIPTION

The following detailed description refers to the accompanying drawings. Wherever possible, the same reference numbers are used in the drawings and the following description to refer to the same or similar elements. While the process herein may be described modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

Aspects of the disclosed process may provide an improvement compared to other methods providing an increment in the heavy and extra-heavy crude oil production in a low production oil well requiring secondary recovery. By a continuous supply of the heated oil to the producing sand, the energy contained in such heated crude fraction causes a dramatic decrease in the viscosity of the crude trapped in the porous of the sand, it eases the fluid flow towards the production well liner due to the lower viscosity and pressure in the suction of the PCP pump. The disclosed process highlights the fact that using the same crude produced at the oil well, there may be little or no risk of causing damage to the producing sand like precipitates or asphaltene deposition because of the compatibility of the crude with the producing sand. The disclosed process shows improvement as compared to the other methods because it may not increase the water content of the produced crude oil or in the production sand. The disclosed process may reduce investment costs because of the simplicity and size of the equipment required to heat and inject the crude. The disclosed process may reduce the operating costs because the process may not require any additional chemical or external substance. The disclosed process also encompasses environmentally friendly technology (only liquid or fuel gas combustion emissions are expelled into the atmosphere).

The disclosed process is based on the continuous injection of energy supplied at the surface by a crude heating unit and injecting it through the annular space of the oil well into the production sand. This energy in the form of heat is transmitted to the porous oil containing rock in the reservoir. As time elapses the temperature of the production zone grows until a heat and mass balance stabilizes and the crude oil produced is constantly replenished by the oil contained in the sand causing the most important effect of the technology that is constant production profile with no decline in time.

The disclosed process may have the advantage, in the case of extra heavy crude oil or heavy crude oil, that the disclosed process could be applied feeding the crude oil directly from the oil well to the claimed plant, thus reducing the addition of the costly diluent for transportation purposes. Importantly, the temperature of the injected crude may not exceed 400° F., which is well below the incipient crude oil cracking temperature of 500° F.

The most widely used EOR method, which is the Cyclic Steam Injection (CSI), has significant disadvantages when compared to HCGD. CSI requires costly chemically treated water to produce steam. The amount of water required is about 5.000 to 10.000 tons per injected cycle of 25 days with the production of the oil well stopped because the steam is injected through the production tube. CSI requires about 42 million BTU/HR of heat while HCGD uses 2 million BTU/HR of heat. Cyclic steam injection generates hydrogen sulphide ($H_2S$) a toxic gas that must be monitored and that finally ends in the atmosphere. In addition, it increases the water cut in the produced crude and in the reservoir. The high temperature steam can cause scale formation in the pores of the production sand due to reservoir water vaporization.

With the historical data of a specific horizontal oil well located at the Orinoco extra-heavy oil Belt, a computer simulation using the Computer Management Group (CMG) software and the detailed geological model of the oil well for 10 years the production of the oil well, in a 10 year period, declined from 900 BPD to 96 BPD and therefore the well required secondary recovery. The HCGD may require continuous injection of, for example, 140 BPD. The net volumetric oil production gain in 10 years (deducting the 96 BPD base crude production) for the HCGD method was 1,201,406 barrels while the volumetric gain in the same 10 years.

FIG. 1 shows a process that may capture one or more of the EOR advantages described above, according to an example. FIG. 1 is an example of the application of the HCGD in vertical wells. Initially the heavy or extra heavy crude 12 may be mixed with a solvent (e.g., naphtha) to lower an original viscosity of the crude 12 to ease a flow of the crude 12 to the crude tank 5. In some aspects, a solvent pump 2 may provide the solvent from a solvent tank 1 via a solvent injection line 3. Once the crude tank 5 reaches a volume threshold (e.g., 20% of its volume), the crude injection pump 9 may start to circulate the crude through the heater 4, and the heating process may start. The heater 4 may raise a temperature of the crude to the injection temperature. In some aspects, the heater 4 may be powered using fuel gas produced by the oil well and/or electricity. In some aspects, separated gas 14 from the crude tank 5 may be sent to a separator 6 (e.g., a gas stabilization tank) to remove its liquid content 8, and the separated gas liquid 8 may be returned to the crude tank 5. In some aspects, at least a portion of the resulting gas 7 from the separator 6 may be used as fuel gas (e.g., by the heater 4) and/or excess gas 18 from the separator 6 may be sent to the crude production line.

After the crude passes through the heater 4, at least a portion of the heated crude 15 may be mixed with the cold crude 12 coming from the oil well to increase its temperature to the storage tank temperature required. The heated crude 15 and the cold crude 12 may form a heated crude mix 17. In some aspects, a hot crude recirculation line, after the heater 4, may send the portion of the heated crude 15 into the crude tank 5 to complete the heating of the incoming crude 12 up to the required crude tank storage temperature. Simultaneously, a portion of the hot crude 10 from the heater 4 may be injected through the annular of the oil well, and the hot crude 10 may be stopped by the high temperature gasket 16 that directs the flow of the hot crude 10 directly into the producing sand. In some aspects, the lower pressure caused by the lift effect of the pump jack, the much lower viscosity of the heated crude, and/or the heat transmission by convection may cause the crude in the sand pores to flow towards the suction of the pump jack, and, as time goes by, the mass and energy balance takes place depending of the amount of energy supplied to the producing sand and the heat transfer mechanisms of the rock in the producing sand. The optimum net volumetric gain of the oil well may be pre-determined through simulation and/or may be adjusted during field operation. Table N°1 shows an example of the 30 days effect of injecting heated crude, in a vertical well producing 11° API crude, with an initial production of 20 BPD, after 5 cycles of steam injection. The net volumetric gain in this case, after 30 days of operation reached 197 BPD, and that is an almost 8 times production increment.

FIG. 2 shows a process that may capture one or more of the HCGD advantages described above, according to an example. FIG. 2 is an example of the application of the HCGD in horizontal wells. Initially, the heavy or extra heavy crude 12 may be mixed with a solvent (e.g., naphtha) to lower an original viscosity of the crude 12 to ease a flow of the crude 12 to the crude tank 5. In some aspects, a solvent pump 2 may provide the solvent from a solvent tank 1 via a solvent injection line 3. Once the crude tank 5 reaches a volume threshold (e.g., 20% of its volume), the crude injection pump 9 may start to circulate the crude through the heater 4, and the heating process may start.

In the case of a horizontal oil well, as shown in FIG. 2, the crude oil and gas coming from the production sand may be separated at the suction of the PCP pump 20 by a downhole separator 21. The crude may be sent to the surface by the PCP pump 20, and the separated gas may go to the surface through the casing. The oil wellhead may have separate lines for crude and gas. In the case of FIG. 2, the gas produced by the oil well is used as fuel gas for the heating unit 4. The liquid 7 contained in the gas 14 is separated from the gas 14 in a gas separator 6, and part of the gas 7 is used as fuel in the heating unit 4 and the excess of gas 18 that is not required to maintain the operating pressure in the tank 5, the separator and gas stabilization tank 6 is sent to the oil production line. The separated liquid 8 may be returned to the crude tank 5.

In some aspects, the heater 4 increases a temperature of the crude to the invention temperature. In some aspects, after the crude passes through the heater 4, part 15 is mixed with the cold crude 12 to be injected into the oil well to heat it up to the crude tank desired temperature. There is a hot crude recirculation line, after the heater 4, that sends part of the crude 14 into the crude tank 5 to complete the heating of the incoming crude 12 to the tank desired temperature. The heated crude 15 and the cold crude 12 may form a heated crude mix 17. Simultaneously, the hot crude 10 at required temperature is injected into the production sand through the injection line 19 that runs from the oil wellhead to an injection nozzle 18 at the best location determined by the geological information of the oil sands surrounding the oil well horizontal liner 16. The hot crude 10 goes directly into the producing sand and penetrates at a radius defined by the reservoir static pressure and the hot crude injection pressure. The lower pressure caused by the lift effect of the PCP pump 20, together with the much lower viscosity of the heated crude 10 and the heat transmission by convection to all mineral components of the production sand, cause the crude in the sand pores to flow towards the suction of the PCP 20. As time goes by, a mass and energy balance takes place depending on the amount of energy supplied to the producing sand and the heat transfer mechanisms of the rock in the producing sand. The optimum net volumetric gain of the oil well could be determined, initially, through simulation and during operation, by adjustment of the RPM of the PCP.

With the historical data of a specific horizontal oil well located at the Orinoco extra-heavy Oil Belt, a computer simulation using the Computer Management Group (CMG) software and the detailed geological model of the oil well, a comparison of the crude volume increments and costs difference between Cyclic Steam Injection and HCGD was run for 10 years. The production of the oil well, in a 10 year period, declined from 900 BPD to 96 BPD and therefore the well required secondary recovery. In the case of CSI, the maximum recommended, per oil well, of four injection cycles was applied. The HCGD requires continuous injection of 140 BPD. The net volumetric oil production gain in 10 years (deducting the base crude production) for the HCGD method was 1,201,406 barrels while the volumetric gain in the same 10 years for CSI was 671,262 Barrels.

In some aspects, as shown in FIGS. 1 and 2, the system that performs the process may include a nitrogen gas tank 13. In some aspects, as shown in FIGS. 1 and 2, excess crude 11 from the incoming crude 12 may be sent to the oil production line.

Although the subject matter has been described in language specific to structural features and/or methodological processes, it is to be understood that the subject matter defined in the appended claims is not necessarily limited to the specific features or processes described above. Rather, the specific features and processes described above are disclosed as example forms of implementing the claims.

What is claimed is:

1. An industrial process comprising:
    mixing heavy or extra heavy crude with a solvent to lower an original viscosity of the crude to ease a flow of the crude to a crude tank;
    once the crude tank reaches a volume threshold, using a crude injection pump to start to circulate the crude through a heater;
    using the heater to raise a temperature of the crude to an injection temperature;
    after the crude passes through the heater, mixing the crude with cold crude coming from an oil well to increase a temperature of the cold crude to a storage tank temperature;
    after the heater, using a hot crude recirculation line to send part of the crude into the crude tank to complete heating of incoming crude up to a crude tank storage temperature;
    simultaneous with the use of the hot crude recirculation line to send the part of the crude into the crude tank, injecting the hot crude through an annular of the oil well; and
    using a high temperature gasket to stop the hot crude and direct the flow of the hot crude directly into producing sand.

2. The process of claim 1, wherein the volume threshold is 20% of the volume of the crude tank.

3. The process of claim 1, wherein using the crude injection pump to start to circulate the crude through the heater starts a heating process.

4. The process of claim 1, wherein the solvent is naphtha.

* * * * *